US012131714B2

(12) United States Patent
Li et al.

(10) Patent No.: US 12,131,714 B2
(45) Date of Patent: Oct. 29, 2024

(54) DISPLAY PANEL AND DISPLAY DEVICE

(71) Applicant: HKC CORPORATION LIMITED, Shenzhen (CN)

(72) Inventors: Jianlei Li, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/912,864

(22) PCT Filed: Dec. 30, 2021

(86) PCT No.: PCT/CN2021/142898

§ 371 (c)(1),
(2) Date: Sep. 20, 2022

(87) PCT Pub. No.: WO2022/247272

PCT Pub. Date: Dec. 1, 2022

(65) Prior Publication Data

US 2024/0212642 A1 Jun. 27, 2024

(30) Foreign Application Priority Data

May 27, 2021 (CN) ......................... 202110581561.5

(51) Int. Cl.
*G09G 3/30* (2006.01)
*G09G 3/36* (2006.01)

(52) U.S. Cl.
CPC ......... *G09G 3/3614* (2013.01); *G09G 3/3677* (2013.01); *G09G 2310/0202* (2013.01); *G09G 2310/0251* (2013.01)

(58) Field of Classification Search
None
See application file for complete search history.

(56) References Cited

U.S. PATENT DOCUMENTS

2008/0246720 A1* 10/2008 Lee ...................... G09G 3/3614 345/96
2014/0159798 A1* 6/2014 Duan .................. G09G 3/3611 327/434
2019/0066614 A1* 2/2019 Tang ................... G02F 1/13452
2020/0035183 A1* 1/2020 Hou ..................... G09G 3/3674

FOREIGN PATENT DOCUMENTS

| | | | |
|---|---|---|---|
| CN | 101281334 | A | 10/2008 |
| CN | 101706632 | A | 5/2010 |
| CN | 109523966 | A | 3/2019 |
| CN | 109817138 | A | 5/2019 |
| CN | 113409718 | A | 9/2021 |
| JP | 2002023709 | A | 1/2002 |

OTHER PUBLICATIONS

Wei Li, the International Searching Authority written comments, Mar. 2022, CN.
Wei Li, the International Search Report, Mar. 2022, CN.

* cited by examiner

*Primary Examiner* — Joseph R Haley

(57) ABSTRACT

A display panel and a display device are disclosed. The display panel includes: a first group of scan lines, a second group of scan lines, pixel units, data lines, and a switching module. In the first display mode, the switching module controls the first group of scan lines to be turned on to charge the corresponding pixel units. In the second display mode, the switching module controls the second group of scan lines to be turned on to charge the corresponding pixel units.

12 Claims, 4 Drawing Sheets

| | | | | | | | |
|---|---|---|---|---|---|---|---|
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |

DISPLAY PANEL AND DISPLAY DEVICE

CROSS-REFERENCE TO RELATED APPLICATIONS

This application is a United States national stage application of co-pending International Patent Application Number PCT/CN2021/142898, filed Dec. 30, 2021, which claims the benefit and priority of Chinese patent application number CN2021105815615, entitled "Display Panel and Display Device" and filed with China National Intellectual Property Administration on May 27, 2021, the entire contents of which are incorporated herein by reference.

TECHNICAL FIELD

This application relates to the field of display technology, and more particularly relates to a display panel and a display device.

BACKGROUND

The statements herein are intended for the mere purpose of providing background information related to the present application and do not necessarily constitute prior art.

Thin-film transistor liquid crystal displays (TFT-LCDs) are increasingly widely used, and people have higher and higher requirements for the performance of liquid crystal displays, as well as more and more stringent requirements for image quality. Wide viewing angle, high contrast, low power consumption, and fast response are the main directions for display performance improvement. A liquid crystal panel generally includes an array substrate and a color filter substrate aligned and bonded as a cell, and liquid crystal molecules are filled between them; the liquid crystal molecules change their positions by voltage. The polarity inversion driving is to apply a voltage signal with a positive and negative polarity to the liquid crystal molecules to realize the AC driving of the liquid crystal molecules. Common driving modes of polarity inversion include row inversion driving mode, column inversion driving mode, frame inversion driving mode and dot inversion driving mode.

However, different driving methods require different driving architectures, making the driving methods extremely limited. Therefore, implementing different driving methods using one shared driving architecture has become an urgent problem to be solved.

SUMMARY

It is therefore a purpose of the present application to provide a display panel and a display device, which can select different driving modes for display.

The present application discloses a display panel, comprising: a first group of scan lines, a second group of scan lines, a pixel unit, data lines and a switching module. When the first group of scan lines is turned on, the display panel displays in the first display mode. When the second group of scan lines is turned on, the display panel displays in the second display mode. The pixel units are arranged in an array. The data lines include a plurality of data lines. When the first group of scan lines or the second group of scan lines is turned on, the data lines provide data signals for the pixel units of the display panel. The switching module is used to switch the on-states of the first group of scan lines and the second group of scan lines. In the first display mode, the switching module controls the first group of scan lines to be turned on, and each of the data lines provides the corresponding pixel unit with a data signal of the same polarity when the first group of scan lines is turned on, and charges the corresponding pixel unit. In the second display mode, the switching module controls the second group of scan lines to be turned on, and each of the data lines provides the corresponding pixel unit with a data signal of the same polarity when the second group of scan lines is turned on, and charges the corresponding pixel unit.

This application further discloses a display device, including a display panel and a driving circuit for driving the display panel. The display panel includes: a first group of scan lines, when the first group of scan lines is turned on, the display panel displays in a first display mode; a second group of scan lines, when the second group of scan lines is turned on the display panel displays in a second display mode; pixel units, the pixel units are arranged in an array; data lines, the data lines include a plurality of data lines, and when the first group of scan lines or the second group of scan lines are turned on, the data lines provide data signals for the pixel units of the display panel; and a switching module for switching the on-states of the first group of scan lines and the second group of scan lines; wherein in the first display mode, the switching module controls the first group of scan lines to be turned on, and each data line provides data signals of the same polarity for the corresponding pixel units when the first group of scan lines is turned on, and charges the corresponding pixel units; in the second display mode, the switching module controls the second group of scan lines to be turned on, and each data line provides the corresponding pixel units with data signals of the same polarity to charge the corresponding pixel units.

Compared with the solution of changing the driving signals to realize different driving modes, the present application directly changes the driving architecture; the present application divides the scan lines into a first group and a second group of scan lines, and the first group of scan lines and the second group of scan lines are respectively controlled by the switching module. Thus, the problem that different driving modes need different driving structures is solved from the hardware level, and only one hardware switch is needed to realize the switching between different display modes.

BRIEF DESCRIPTION OF DRAWINGS

The accompanying drawings, which are included to provide a further understanding of the embodiments of the present application, constitute a part of the specification, are used to illustrate the embodiments of the present application, and together with the written description, serve to explain the principles of the present application. Obviously, the drawings used in the following description merely depict some embodiments of the present application, and for those having ordinary skill in the art, other drawings can also be obtained from these drawings without investing creative effort. In the drawings.

DETAILED DESCRIPTION OF EMBODIMENTS

Figure 1:
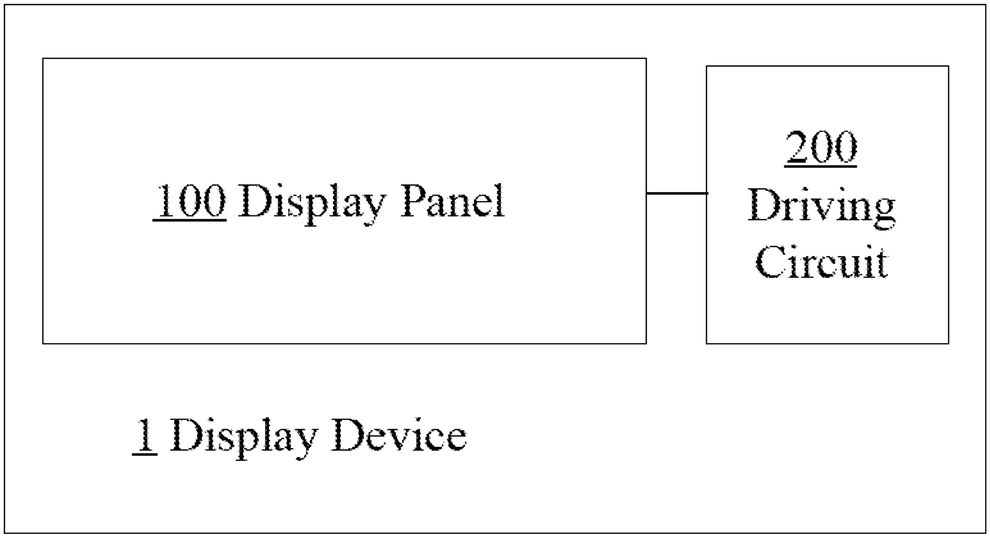
FIG. 1 is a schematic diagram of a display device according to an embodiment of the present application.

It should be understood that the terminology used herein, the specific structural and functional details disclosed are intended for the mere purpose of describing specific embodiments and are representative, but the present application may be embodied in many alternative forms and should not be construed as limited only the embodiments set forth herein.

In the description of this application, the terms "first" and "second" are merely used for description purposes, and cannot be understood as indicating relative importance, or implicitly indicating the number of indicated technical features. Thus, unless otherwise specified, features defined as "first" and "second" may expressly or implicitly include one or more of the features; "plurality" means two or more. The terms "including", "comprising", and any variations thereof are intended to mean a non-exclusive inclusion, namely one or more other features, integers, steps, operations, units, components and/or combinations thereof may be present or added.

In addition, terms such as "center", "transverse", "lateral", "above", "on". "under", "below". "left". "right", "vertical", "horizontal", "top", "bottom", "inside", "outside", etc., indicative of orientations or positional relationships are described based on the orientations or relative positional relationships illustrated in the drawings, and are intended for the mere purpose of convenience of simplified description of the present application, rather than indicating that the device or element referred to must have a specific orientation or be constructed, and operate in a particular orientation.

Thus, these terms should not be construed as limiting the present application.

In addition, unless otherwise expressly specified and defined, terms "installed on", "connected to", and "coupled to" should be understood in a broad sense. For example, it may be a fixed connection, a detachable connection, or an integral connection; it may be a mechanical connection, or may also be an electrical connection; it may be a direct connection, an indirect connection through an intermediate medium, or an internal connection between two components. For those having ordinary skill in the art, the specific meanings of the above terms in this application can be understood depending on specific contexts.

The present application will be described in detail below with reference to the accompanying drawings and optional embodiments.

Figure 2:
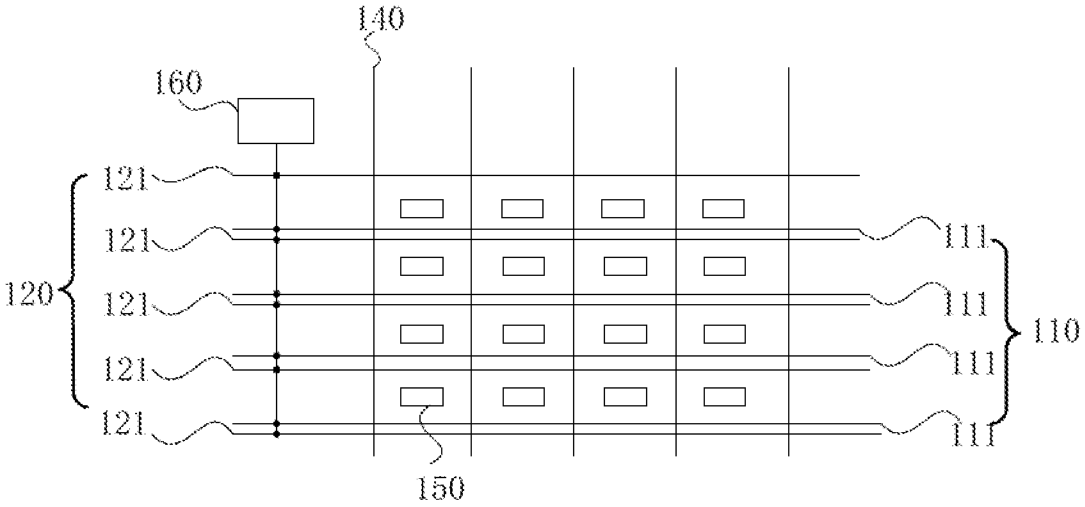
FIG. 2 is a schematic diagram of a display panel according to an embodiment of the present application.

As illustrated in FIGS. 1-2, as an embodiment of the present application, a display device 1 is disclosed. The display device 1 includes a display panel 100 and a driving circuit 200 for driving the display panel 100. The display panel 100 includes: a first group of scanning Line 110, a second group of scan lines 120, pixel units 150, data lines 140, and a switching module 160. The pixel units 150 are arranged in an array. The data lines 140 include a plurality of data lines. When the first group of scan lines 110 or the second group of scan lines 120 are turned on, the data lines 140 provide data signals for the pixel units 150 of the display panel 100. The switching module 160 is used to switch the ON states of the first group of scan lines 110 and the second group of scan lines 120. When the first group of scan lines 110 is turned on, the display panel 100 is displayed in the first display mode. When the second group of scan lines 120 are turned on, the display panel 100 is displayed in the second display mode.

In the first display mode, the switching module 160 controls the first group of scan lines 110 to be turned on, and each data line 140 provides data signals of a same polarity for the corresponding pixel units 150 when the first group of scan lines 110 is turned on, thus charging the corresponding pixel units 150. In the second display mode, the switching module 160 controls the second group of scan lines 120 to be turned on, and each data line 140 provides the corresponding pixel units 150 with data signals of the same polarity to charge the corresponding pixel units 150 When the second group of scan lines 120 is turned on.

Compared with the solution of changing the driving signals to realize different driving modes, the present application directly changes the driving architecture; the present application divides the scan lines into a first group and a second group of scan lines 120, and the first group of scan lines 110 and the second group of scan lines 120 are respectively controlled by the switching module 160. Thus, the problem that different driving modes need different driving structures is solved from the hardware level, and only one hardware switch is needed to realize the switching between different display modes.

It should be noted that, different display modes stated here correspond to different driving architectures, and the present application integrates different driving architectures into one driving architecture. Here, the scan lines are divided into the first group and the second group. Instead of dividing the scan lines into different types of scan lines, when the scan lines on the display panel 100 are turned on in different display modes, the required scan lines are divided into the first group of scan lines 110 or a second group of scan lines 120. The first display mode and the second display mode of the present application respectively take polarity inversion as an example. The first display mode is a display mode driven by column inversion, and the second display mode is a display mode driven by inversion by two rows and columns. The following description is provided in connection with the specific drive architecture.

As illustrated in FIG. 2, as a specific embodiment of the present application, a display panel 100 is disclosed. The display panel 100 includes: a first group of scan lines 110, a second group of scan lines 120, pixel units 150, data lines 140, and a switching module 160. The first group of scan lines 110 includes a plurality of first scan lines 111, and the second group of scan lines 120 includes a plurality of second scan lines 121. Each row of the pixel units 150 is arranged corresponding to one of the first scan lines 111 and one of the second scan lines 121.

In the first display mode, among the plurality of first scan lines 111, the polarities of the pixel units 150 in the same column corresponding to two adjacent first scan lines 111 are different. In the second display mode, among the plurality of second scan lines 121, two adjacent second scan lines 121 constitute a group of second scan lines 121, the polarities of the pixel units 150 in the same column corresponding to two adjacent groups of the second scan lines 121 are different.

The first display mode of the present application is that the corresponding polarities of the pixel units 150 in two adjacent rows are different, that is, the corresponding polarities are "+−+−". The second display mode is that among four adjacent rows of pixel units 150, corresponding to the same column of pixel units 150, the corresponding polarities are "++−−". Between adjacent frames, the polarities corresponding to the first display mode are "−+−+"; the polarities corresponding to the second display mode is "−−++". Of course, the "+−+−" and "++−−" mentioned here are merely examples, and in actual practice, they may be "−+−+" or "−−++", which are however not limited here. In this embodiment, the adjacent data lines 140 provide data signals of different polarities for the pixel units 150. Corresponding to each data line 140, no polarity inversion is performed within one frame. The present application uses the column inversion driving method to achieve the display effect of dot inversion. Since the polarity switching frequency of the column inversion driving method is much lower than that of the dot inversion driving method, the column inversion driving method can save power. The dot inversion is driven by the column inversion driving mode, thereby realizing the display effect of dot inversion.

Specifically, the first scan line 111 and the second scan line 121 corresponding to the same row of pixel units 150 are respectively disposed above or below this row of pixel units 150, that is, the first scan line 111 and the second scan line 121 are located on different sides of the pixel units 150. It should be noted that the scan lines and the data lines 140 in the present application are the scan lines and the data lines 140 arranged horizontally and the data lines 140 arranged vertically that are common in the display panel 100, respectively. The corresponding pixel units 150 are also arranged in a matrix in the horizontal and vertical directions.

Figures 3, 4:
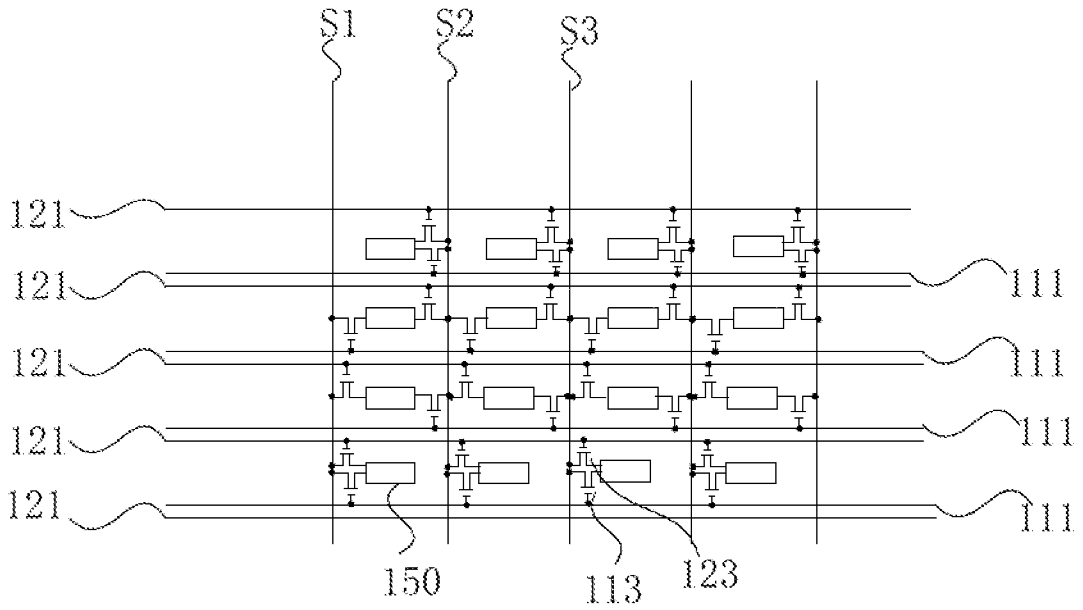
FIG. 3 is a schematic diagram of a display panel according to another embodiment of the present application.
FIG. 4 is a schematic diagram illustrating the polarities of the first display mode according to an embodiment of the present application.

As illustrated in FIG. 3, the display panel 100 further includes a plurality of first active switches 113 and a plurality of second active switches 123. The gate of each first active switch 113 is connected to the corresponding first scan line 111. The gate of each second active switch 123 is connected to the corresponding second scan line 121. Each of the pixel units 150 is connected to the drain of one of the first active switches 113 and the drain of one of the second active switches 123. In the pixel units 150 in the same column, the sources of the two adjacent first active switches 113 are respectively connected to different data lines 140. Two adjacent second active switches 123 constitute a group of second active switches 123. The sources of the adjacent two groups of the second active switches 123 are respectively connected to different data lines 140. That is, on the same data line 140, the first active switches 113 corresponding to two adjacent rows of pixel units 150 constitute a group, and the sources of each other group of first-type active switches are connected to this data line 140. On the same data line 140, the sources of the second type of active switches in every other row are connected to the data line 140.

Taking the display panel 100 illustrated in FIG. 3 as an example. The number of the first group of scan lines 110 is the same as the number of the second group of scan lines 120, and each pixel switch is set corresponding to one first active switch 113 and one second active switch 123. Taking the pixel units 150 in the first column of the pixel units 150 in the first row to the fourth row of pixel units 150 as an example, the first active switch 113 and the second active switch 123 corresponding to the pixel unit 150 in the first row and the first column are both connected to data line S2. The first active switch 113 corresponding to the pixel unit 150 in the second row and the first column is connected to the data line S1, and the corresponding second active switch 123 is connected to the data line S2. The first active switch 113 corresponding to the pixel unit 150 in the third row and the first column is connected to the data line S2, and the corresponding second active switch is connected to the data line S1. The first active switch 113 and the second active switch 123 corresponding to the pixel unit 150 in the fourth row and the first column are both connected to the data line S1. This arrangement only corresponds to a specific embodiment of the above solution, where with four adjacent rows of pixel units 150 as a group, the arrangement order within the group can be changed; it is not limited here.

When displaying in the first display mode, only the first group of scan lines 110 is turned on, and the corresponding first active switches 113 are turned on to charge the respective pixel units 150. When displaying in the second display mode, only the second group of scan lines 120 is turned on, and the corresponding second active switches 123 are turned on to charge the respective pixel units 150. In this embodiment, the same data line 140 only provides data signals of one polarity in one frame, and provides data signals of different polarities in adjacent frames. Furthermore, the polarities of the adjacent two data lines 140 are different.

Therefore, in the first display mode, in the same frame, the polarities of two adjacent pixel units 150 are different, thereby realizing dot inversion. Between adjacent frames, the polarities of the same pixel unit 150 are different.

Figure 5:
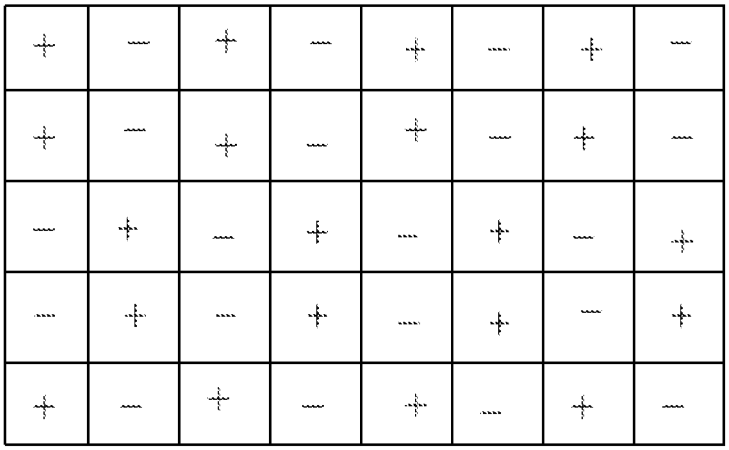
FIG. 5 is a schematic diagram illustrating the polarities of the second display mode according to an embodiment of the present application.

Correspondingly, FIG. 4 shows the polarity change of the first display mode, and FIG. 5 shows the polarity change of the second display mode. With respect to the second display mode, in the same frame, the corresponding polarities of pixel units 150 in every two rows are the same, and the polarities of the pixel units in an adjacent column are different, that is, this mode corresponds to two-column inversion (2-Line inversion). Between adjacent frames, the polarities of the same pixel unit 150 are different. The first display mode uses the column inversion driving method to realize the display effect of dot inversion. Since the polarity switching frequency of the column inversion driving mode is much lower than that of the dot inversion driving mode, the column inversion driving mode saves power, but the display effect of dot inversion is better than that of column inversion. The second display mode uses a column inversion driving method to achieve a good display effect of 2-Line inversion, and has a better viewing angle. In actual use, the required scan lines to be driven will be selected depending on different display modes. In the exemplary technology, if the display effect of 2-Line inversion is realized through the first group of scan lines 110 by changing the polarities of the data lines 140 within one frame, the power consumption will be large. Using the second group of scan lines 120 to drive and realize the display effect of dot inversion will also change the polarities of the data lines 140 within one frame, which increases power consumption. Therefore, this embodiment has the effect of reducing power consumption.

It should be noted that, in the arrangement order of the pixel units 150 in this application, for example, a column of pixel units 150 corresponding to the first data line S1 are all red pixels R, and a column of pixel units 150 corresponding to the second data line S2 are all green pixels G, a column of pixel units 150 corresponding to the third data line S3 are blue pixels B. In the direction of a row of scanning line, RGB are arranged in sequence, and each R pixel. G pixel or B pixel is set corresponding to a data line 140, and the corresponding data line 140 provides pixel voltages to the pixel units 150. Furthermore, the arrangement order of the three pixel units 150 on the corresponding first column data line 140 to the third column data line 140110 may be RGB, GBR, BRG, etc., and the arrangement order is not limited here.

Specifically, the manner in which the switching module 160 implements switching between the first display mode and the second display mode on hardware can be divided into the following two embodiments.

Figure 6:
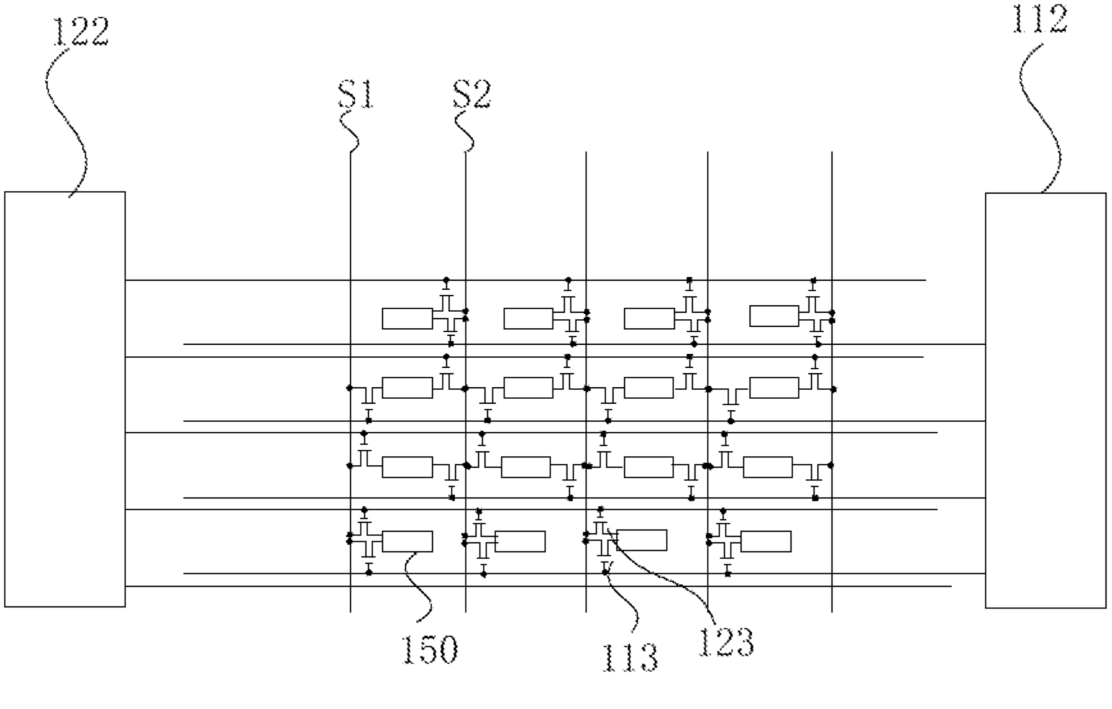
FIG. 6 is a schematic diagram of a display panel according to yet another embodiment of the present application.

As illustrated in FIG. 6, the display panel 100 includes a first scan driving circuit 112 and a second scan driving circuit 122, and the switching module 160 controls the first scan driving circuit 112 to drive the first group of scan lines 110 to turn on; The switching module 160 controls the second scan driving circuit 122 to drive the second group of scan lines 120 to turn on; the first scan driving circuit 112 and the second scan driving circuit 122 are arranged on different sides of the display panel 100.

In this embodiment, the first scan lines 111 and the second scan lines 121 are driven respectively by arranging different scan driving circuits on both sides, and the different scan driving circuits are controlled by the switching module 160. When different display modes are required, it is free to choose. Furthermore, it is only needed to add one more drive circuit on one side. Moreover, in practical applications, the switching module 160 can perform dynamic selection, that is, the first display mode can be used in the previous frame, and the second display mode can be used in the current frame. This method can be applied to high frame rate display, that is, under 60 HZ. 120 HZ, within 1 second, half of the frames selects the first display mode, and another half selects the second display mode.

For the switching module 160, another dynamic selection is also possible. It is also possible to use the next frame to turn on the second scan line 121 corresponding to the pixel units 150 of the current row after the pixel units 150 of the current row are charged through the first scan line 111 in the current frame, and use the second scan line 121 to discharge the pixel units 150 of the current row, so that there is a certain grayscale difference between the pixel unit 150 of the current row and the pixel unit 150 of the previous row, and the wide-angle display effect is better.

It should be noted that, for a large-size panel, the display panel 100 that needs to be driven on both sides at the same time can also be provided with the second scan driving circuits 122 on both sides without affecting each other. Of course, there is another way, as follows.

Figure 7:
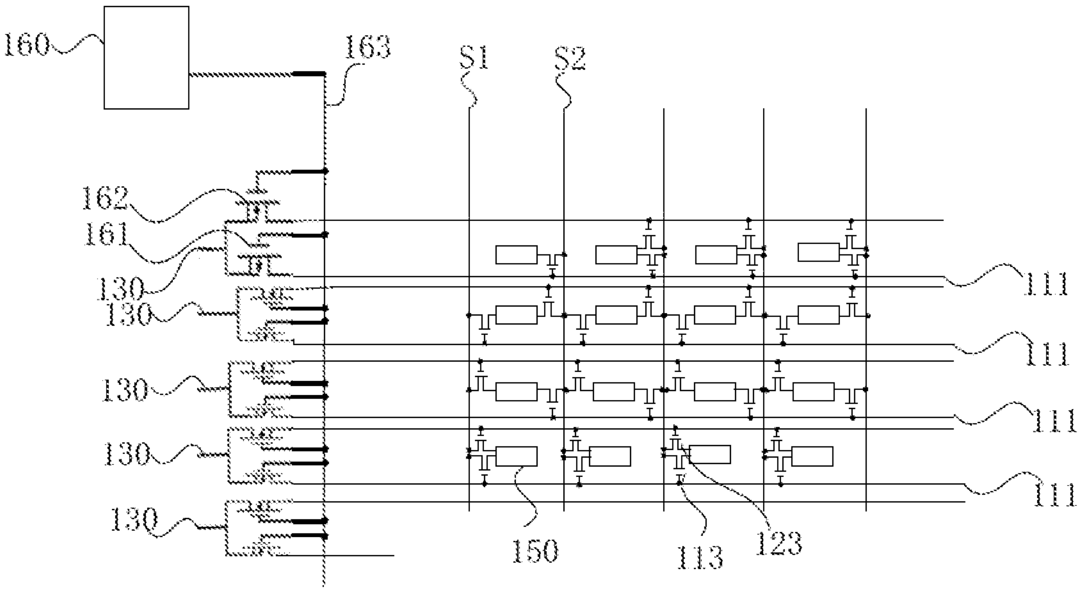
FIG. 7 is a schematic diagram of a display panel according to still another embodiment of the present application.

As illustrated in FIG. 7, the switching module 160 includes a plurality of P-type switches 161, a plurality of N-type switches 162 and a control signal line 163. The display panel 100 further includes a plurality of scan driving lines 130. In the first group of scan lines 110, each of the first scan lines 111 is correspondingly connected to a P-type switch 161. In the second group of scan lines 120, each of the second scan lines 121 is correspondingly connected to an N-type switch 162. The control terminals of the plurality of P-type switches 161 and the control terminals of the plurality of N-type switches 162 are connected to the control signal line 163. The first scan line 111 and the second scan line 121 corresponding to the pixel units 150 in each row are respectively connected to the same scan driving line 130 through the respective P-type switch 161 and respective N-type switch 162.

In this embodiment, the first group of scan lines 110 and the second group of scan lines 120 are turned on through different switches. In addition, in this embodiment, the first group of scan lines 110 and the second group of scan lines 120 can be turned on respectively only through the control of the switching module 160 by using the double-sided driving circuits.

Figure 8:
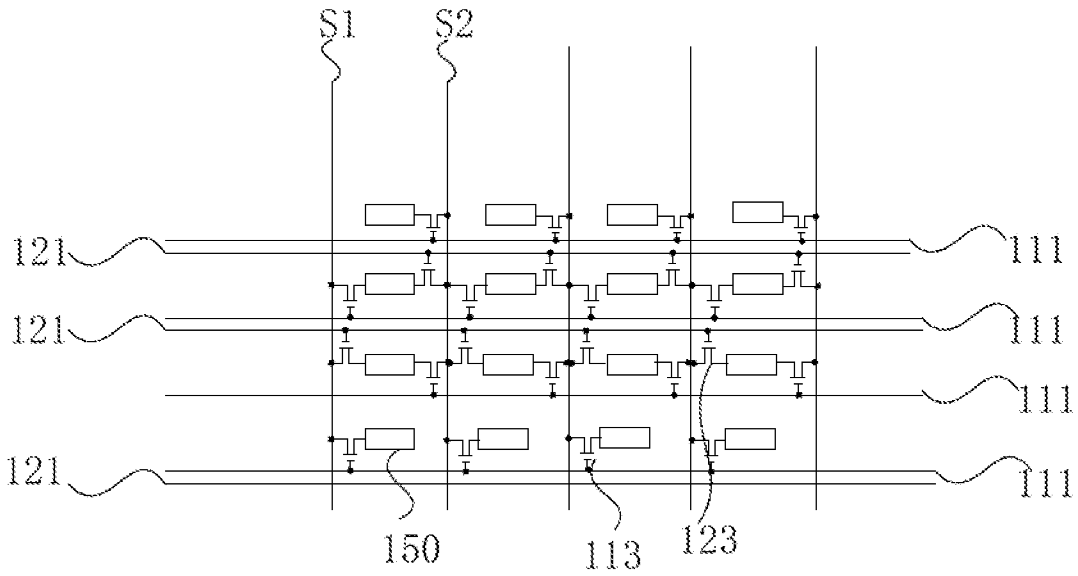
FIG. 8 is a schematic diagram of a display panel according to still another embodiment of the present application.

As illustrated in FIG. 8, as another embodiment of the present application, another display panel 100 is disclosed. The display panel 100 further includes a plurality of third active switches and a plurality of fourth active switches. The third active switch in this embodiment is the first active switch 111, and the fourth active switch is the second active switch 112. The first group of scan lines 110 includes a plurality of first scan lines 111, and the second group of scan lines 120 includes a plurality of second scan lines 121. The gate of the third active switch is connected to the corresponding first scan line 111. The gate of the third active switch is connected to the corresponding second scan line 121. The pixel units 150 in adjacent four rows constitute a group of pixel units 150. In a group of pixel units 150, each row of the pixel units 150 corresponds to one of the first scan lines 111 respectively, and only two rows of the pixel units 150 are each arranged to correspond to one of the second scan lines 121. In the first display mode, in the group of pixel units 150, the polarities of the pixel units 150 in the same column corresponding to two adjacent first scan lines 111 are different. The sources of the corresponding two adjacent first active switches 113 are respectively connected to different data lines 140. In the second display mode, in the group of pixel units 150, the polarities of the pixel units 150 on the same data line 140 corresponding to the two second scan lines are different. The sources corresponding to the two second active switches 123 are respectively connected to different data lines 140. In the second display mode, only the pixel units 150 corresponding to the first scan lines 111 are driven by the first group of scan lines 110.

Specifically, in a group of the pixel units 150, the pixel units 150 in the second row and the pixel units 150 in the third row are each disposed corresponding to one of the second scan lines 121. In this embodiment, the first scan line 111 and the second scan line 121 corresponding to the first row of pixel units 150 in FIG. 3 are combined into one scan line, which can reduce wiring arrangement and improve the aperture ratio.

It should be noted that, among the pixel units 150 in the first row to the fourth row, the pixel units 150 in the first row are arranged corresponding to only one scan line, and the pixel units 150 in the second row are arranged corresponding to the first scan line 111 and the second scan line 121. During the driving process, the scan line of the first row is a shared scan line, that is, the scan line of the first row is driven regardless of the first display mode or the second display mode. That is, corresponding to the row of pixel units 150 in which a row of pixel units 150 corresponds to a first scan line 111 in FIG. 8, the corresponding first scan line 111 is a shared scan line. Different from the previous embodiments, in a group of the pixel units 150, the pixel units 150 in the first row and the pixel units 150 in the fourth row are respectively disposed corresponding to one of the second scan lines 121.

It should be noted that the inventive concept of the present application can form a large number of embodiments, but they cannot be enumerated because the length of the application document is limited. The technical features as set forth herein can be arbitrarily combined to form a new embodiment, and the original technical effects may be enhanced after various embodiments or technical features are combined.

The technical solutions of the present application may be widely used in various display panels, such as TN (Twisted Nematic) display panels, IPS (In-Plane Switching) display panels, VA (Vertical Alignment) display panels, and MVA (Multi-Domain Vertical Alignment) display panels. Of course, the above solutions are also applicable to other types of display panels.

The foregoing is a further detailed description of the present application in conjunction with specific optional embodiments, but it should not be construed as that the specific implementation of the present application will be limited to these descriptions. For those having ordinary skill in the technical field of the present application, without departing from the scope and spirit of the present application, some simple deductions or substitutions can be made, which should all be regarded as falling in the scope of protection of the present application.

What is claimed is:

1. A display panel, comprising:

a first group of scan lines, wherein when the first group of scan lines are turned on, the display panel displays in a first display mode;

a second group of scan lines, wherein when the second group of scan lines are turned on, the display panel displays in a second display mode;

a plurality of pixel units, arranged in an array;

a plurality of data lines, wherein when the first group of scan lines or the second group of scan lines are turned on, the plurality of data lines are configured to provide data signals for the plurality of pixel units of the display panel;

a switching circuit, configured for switching between an on-state of the first group of scan lines and an on-state of the second group of scan lines;

wherein in the first display mode, the switching circuit is configured to control the first group of scan lines to be turned on, and each data line is configured to provide data signals of a same polarity for the corresponding pixel units when the first group of scan lines is turned on, thus charging the corresponding pixel units;

wherein in the second display mode, the switching circuit is configured to control the second group of scan lines to be turned on, and each data line is configured to provide data signals of a same polarity for the corresponding pixel units when the first group of scan lines is turned on, thus charging the corresponding pixel units;

wherein the first group of scan lines comprise a plurality of first scan lines, and the second group of scan lines comprise a plurality of second scan lines;

wherein the pixel units in each row are arranged corresponding to one of the first scan lines and one of the second scan lines;

wherein in the first display mode, among the plurality of first scan lines, the polarities of the pixel units in each same column corresponding to two adjacent first scan lines are different;

wherein in the second display mode, among the plurality of second scan lines, two adjacent second scan lines constitute a group of second scan lines, and the polarity of the pixel units in the same column corresponding to adjacent two groups of second scan lines are different between the adjacent two groups;

wherein the display panel further comprises a plurality of first active switches and a plurality of second active switches;

wherein a gate of each first active switch is connected to the respective first scan line; a gate of each second active switch is connected to the respective second scan line;

wherein each of the pixel units is connected to a drain of the respective first active switch and to a drain of the respective second active switch;

wherein in the pixel units in each same column, the sources of adjacent two first active switches are respectively connected to different data lines; adjacent two second active switches constitute a group of second active switches, and the sources of the adjacent two groups of second active switches are respectively connected to different data lines between the two adjacent groups.

2. The display panel of claim 1, wherein every two adjacent data lines are configured to provide data signals of different polarities for the respective pixel units.

3. The display panel of claim 1, wherein the display panel comprises a first scan driving circuit and a second scan driving circuit, wherein the switching circuit is configured to control the first scan driving circuit to drive the first group of scan lines to be turned on; and the switching circuit is configured to control the second scan driving circuit to drive the second group of scan lines to be turned on;

wherein the first scan driving circuit and the second scan driving circuit are respectively disposed on different sides of the display panel.

4. The display panel of claim 1, wherein the switching circuit comprises a plurality of P-type switches, a plurality of N-type switches, and a control signal line;

wherein the display panel further comprises a plurality of scan driving lines;

wherein in the first group of scan lines, each of the first scan lines is connected to a respective P-type switch; in the second group of scan lines, each of the second scan lines is connected to a respective N-type switch; wherein the control terminals of the plurality of P-type switches and the control terminals of the plurality of N-type switches are connected to the control signal line;

wherein the first scan line and the second scan line corresponding to the pixel units in each row are connected to the same scan drive line through the corresponding P-type switch and N-type switch, respectively.

5. The display panel of claim 1, wherein the pixel units comprise a red pixel, a green pixel, and a blue pixel, wherein the same data line is arranged corresponding to only red pixels, only green pixels or only blue pixels.

6. The display panel of claim 1, wherein the switching circuit is operative to perform dynamic selection, wherein a previous frame uses the first display mode, and a current frame uses the second display mode.

7. The display panel of claim 1, wherein the switching circuit is operative perform dynamic selection, and wherein within a period of 1 second, a half of the frames use the first display mode, and another half of frames use the second display mode.

8. The display panel of claim 1, wherein the switching circuit is operative to perform dynamic selection, wherein after the current row of pixel units is charged through the first scan line in a current frame, a next frame is used to turn on the second scan line corresponding to the current row of pixel units, and wherein the second scan line is used to discharge the pixel units of the current row.

9. A display device, comprising a display panel and a drive circuit configured for driving the display panel, wherein the display panel comprises:

a first group of scan lines, wherein when the first group of scan lines are turned on, the display panel displays in a first display mode;

a second group of scan lines, wherein when the second group of scan lines are turned on, the display panel displays in the second display mode;

a plurality of pixel units, which are arranged in an array;

a plurality of data lines, wherein when the first group of scan lines or the second group of scan lines are turned on, the plurality of data lines are configured to provide data signals for the plurality of pixel units of the display panel;

a switching circuit, configured for switching between an on-state of the first group of scan lines and an on-state of the second group of scan lines;

wherein in the first display mode, the switching circuit is configured to control the first group of scan lines to be turned on, and each data line is configured to provide data signals of a same polarity for the corresponding pixel units when the first group of scan lines is turned on, thus charging the corresponding pixel units;

wherein in the second display mode, the switching circuit is configured to control the second group of scan lines to be turned on, and each data line is configured to provide data signals of a same polarity for the corresponding pixel units when the first group of scan lines is turned on, thus charging the corresponding pixel units;

wherein the first group of scan lines comprise a plurality of first scan lines, and the second group of scan lines comprise a plurality of second scan lines;

wherein the pixel units in each row are arranged corresponding to one of the first scan lines and one of the second scan lines;

wherein in the first display mode, among the plurality of first scan lines, the polarities of the pixel units in each same column corresponding to two adjacent first scan lines are different;

wherein in the second display mode, among the plurality of second scan lines, two adjacent second scan lines constitute a group of second scan lines, and the polarity of the pixel units in the same column corresponding to adjacent two groups of second scan lines are different between the adjacent two groups;

wherein the display panel further comprises a plurality of first active switches and a plurality of second active switches;

wherein a gate of each first active switch is connected to the respective first scan line; a gate of each second active switch is connected to the respective second scan line;

wherein each of the pixel units is connected to a drain of the respective first active switch and to a drain of the respective second active switch;

wherein in the pixel units in each same column, the sources of adjacent two first active switches are respectively connected to different data lines; adjacent two second active switches constitute a group of second active switches, and the sources of the adjacent two groups of second active switches are respectively connected to different data lines between the two adjacent groups.

10. The display device of claim 9, wherein every two adjacent data lines are configured to provide data signals of different polarities for the respective pixel units.

11. The display device of claim 9, wherein the display panel comprises a first scan driving circuit and a second scan driving circuit, wherein the switching circuit is configured to control the first scan driving circuit to drive the first group of scans to be turned on; and the switching circuit is configured to control the second scan driving circuit to drive the second group of scan lines to be turned on;

wherein the first scan driving circuit and the second scan driving circuit are respectively disposed on different sides of the display panel.

12. The display device of claim 9, wherein the switching circuit comprises a plurality of P-type switches, a plurality of N-type switches, and a control signal line;

wherein the display panel further comprises a plurality of scan driving lines;

wherein in the first group of scan lines, each of the first scan lines is connected to a respective P-type switch; in the second group of scan lines, each of the second scan lines is connected to a respective N-type switch; wherein the control terminals of the plurality of P-type switches and the control terminals of the plurality of N-type switches are connected to the control signal line;

wherein the first scan line and the second scan line corresponding to the pixel units in each row are connected to the same scan drive line through the corresponding P-type switch and N-type switch, respectively.

* * * * *